R. J. ZANONE.
AUTOMATIC SCALE.
APPLICATION FILED FEB. 7, 1916. RENEWED NOV. 12, 1917.
1,269,360.
Patented June 11, 1918.
2 SHEETS—SHEET 1.
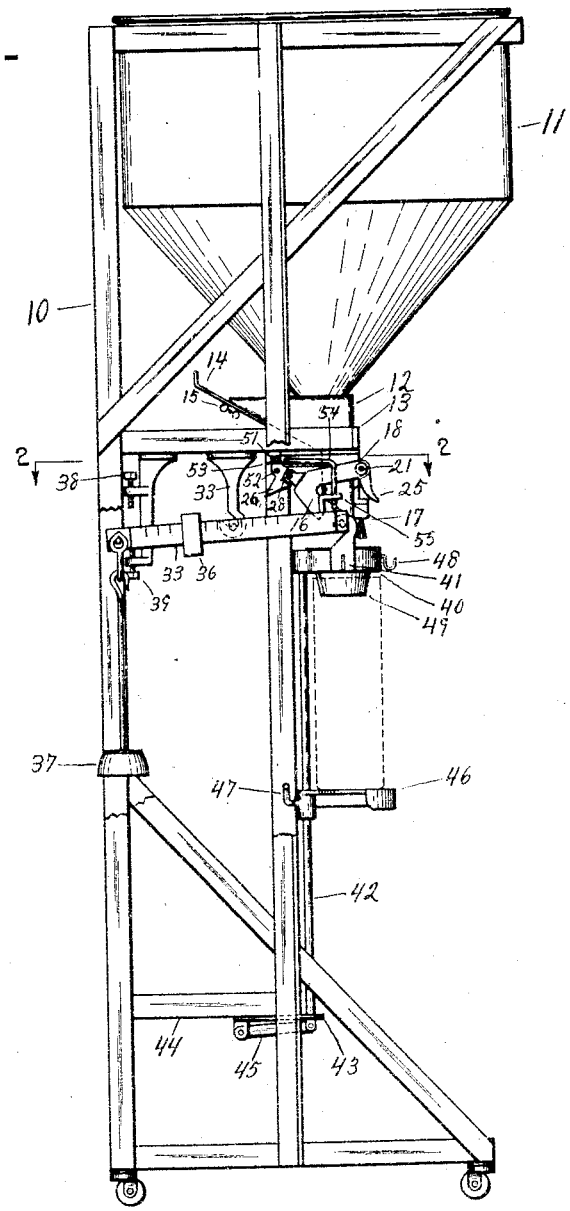
Fig-1-
INVENTOR
Richard J. Zanone
BY
R. B. Munnell
ATTORNEY

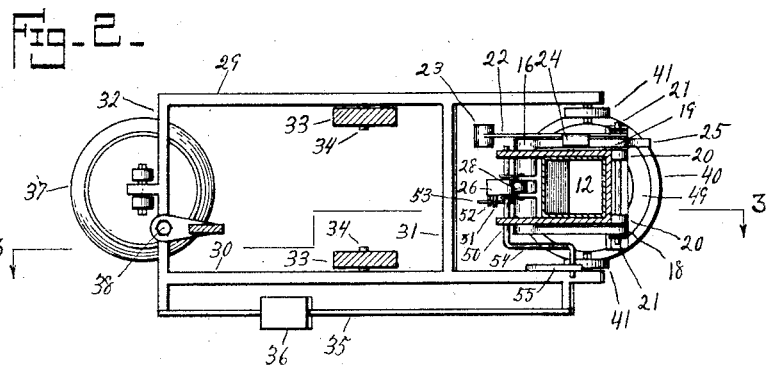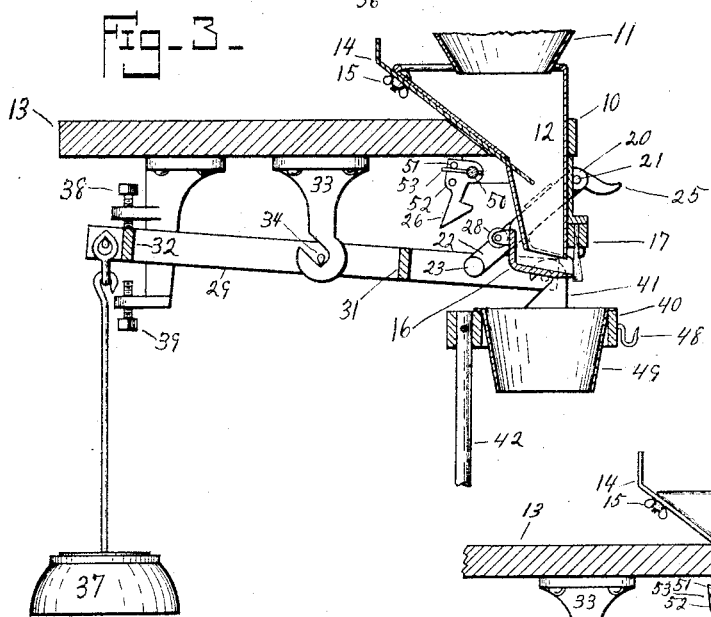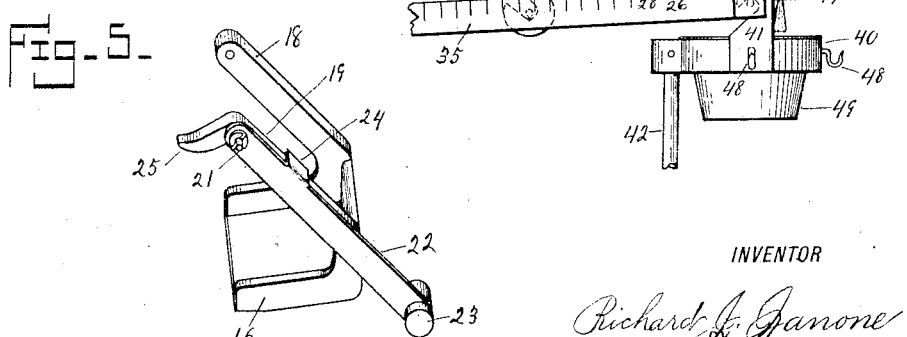

UNITED STATES PATENT OFFICE.

RICHARD J. ZANONE, OF NEW ALBANY, INDIANA.

AUTOMATIC SCALE.

1,269,360.   Specification of Letters Patent.   Patented June 11, 1918.

Application filed February 7, 1916, Serial No. 76,543. Renewed November 12, 1917. Serial No. 201,657.

*To all whom it may concern:*

Be it known that I, RICHARD J. ZANONE, a citizen of the United States, residing in the city of New Albany, county of Floyd, and State of Indiana, have invented certain new and useful Improvements in Automatic Scales, of which the following is a specification.

This invention relates to automatic scales. In establishments disposing of commodities in packages of different weights, it is customary, in order to facilitate the handling of trade, to prepare packages during the odd moments in the lull of trade. The ordinary way of doing this is to place the container, usually a paper bag, on the scale platform, and transfer the commodity thereto, from a large receptacle, by means of a scoop. This is a slow and inaccurate process as it is difficult to check the flow from the scoop instantly when the scale balances, with the result that "down weight" is given in most cases, with careless or inefficient employees, this overweight may be considerable and occasion serious loss.

An object of this invention is to provide means whereby a predetermined quantity of commodity may be deposited in a container which is included in the predetermined weight.

A further object is to provide a scale of the class described which will be accurate, easily manipulated, and durable in service, and which will be economical in construction.

With the foregoing and other objects in view the invention consists of the novel construction and arrangement of parts illustrated in the accompanying drawing, which forms a part of this specification, wherein is set forth an embodiment of the invention, but it is to be understood that such changes and modifications may be resorted to as come within the scope of the appended claims.

Referring to the drawing wherein similar reference characters designate like parts in the several views Figure 1, is a side elevation, portions of the frame being broken away, showing parts in the position assumed when a commodity is being admitted to a container; Fig. 2, a horizontal section on line 2—2 of Fig. 1; Fig. 3, a vertical section of a portion of the device on line 3—3 of Fig. 2; showing the position of parts when the scale beam is borne down by a weighed portion; Fig. 4, a detail, on an enlarged scale, showing the feed gate open; Fig. 5, a perspective view of the feed gate and recoil lever.

In the embodiment of the invention illustrated herewith the frame —10— is constructed of angle iron and supports a suitable storage hopper —11—. A chute —12— into which the storage hopper discharges, is supported by a platform —13—, which is suitably secured to the frame. A slide —14—, adjustably secured by means of a thumb screw —15— may be extended into the chute to regulate, or cut off, the flow of commodity therethrough. A gate —16— serves to close the lower end of the chute and cut off the flow of commodity therefrom. A brush —17— secured on the forward side of the chute in such position that the bristles extend below the lower edge thereof provides a resilient abutment for the forward edge of the gate, thereby obviating any danger of the gate failing to close completely, by reason of particles of commodity being caught between the edges of the gate and the abutment. The gate is swung, by means of arms —18, 19—, from ears —20—, being swung on pins —21. The point of suspension of the gate lies forward of its center of gravity, hence it tends to close by gravity. A recoil arm —22— having a terminal weight —23— is pivoted coaxially with the arms 18, 19 and extends parallel therewith having a lateral projection —24— which rests upon the edge of one of them. The recoil arm, by its weight, assists in closing the gate and also takes up the recoil preventing any rebound of the gate. The gate is opened by manual pressure exerted on a thumb piece —25— extended forward from the arm 19. The gate is held open by means of a catch —26— which engages with a roller —28— on the rear of the gate. A scale beam comprising a pair of parallel arms —29, 30— rigidly connected by transverse bars —31, 32— is pivotally supported on depending brackets —33— by means of pivots —34—. A graduated scale bar —35— is secured along one of the arms, and a poise weight —36— is adapted to be adjusted therealong. Weights as —37— are suspended by suitable means from the rear of the scale beam. The throw of the scale beam may be regulated by means of adjusting screws —38, 39—. A ring —40— is pivotally suspended from the forward end of the scale beam by suitable means such as ears —41—. A rod —42— depends from the ring, passing through a guide member —43— extended forward from a shelf —44. The rod 42 is constrained to move in vertical planes by means of a distance rod —45—. A shelf —46— for the support of a container, such as a paper bag, or carton, movably positioned on the rod 42, may be secured in adjusted position by means of set screws —47—. Hooks —48— disposed about the ring are available for attaching a fabric container. A funnel —49— carried by the ring serves to guide the commodity into a container. The catch 26 swings upon a shaft —50— its movement being limited by the arrangement of studs —51, 52—, which project from one side thereof and engage with a pin —53— which extends from the shaft. By this arrangement the catch may yield, to engage and retain the gate, without disturbing the shaft, but movement of the shaft will, by reason of the pin 53 engaging the stud 51, move the catch to release the gate and allow it to close. The shaft has an angular extension —54— which extends forward, downward, and outward into position to be engaged by an L shaped projection —55— from the upper edge of the scale beam.

In operation, a quantity of commodity, as a bag of coffee, is placed in the storage hopper, the poise weight set at the amount it is desired to weigh, a container, as a paper bag, opened out and placed on the shelf 46, which is then adjusted so that the mouth of the bag embraces the funnel. With the bag properly adjusted the feed gate is opened by pressure on the lever 25, which lies within convenient reach of the operator's thumb. It is to be observed that the commodity flows direct from the storage hopper through the chute, into the ultimate container, which is supported by the scale beam. As the scale beam approaches equilibrium the projection 55 contacts with the extension 54 and rocks the shaft 50 and thereby through the medium of the pin 53, which engages the stud 51, shifts the catch 26 and allows the feed gate to close, cutting off the flow of commodity into the container, which may then be removed, another container placed into position and the operation repeated. The scale is on rollers so that it may be readily moved to any convenient position and the salespeople may put in their odd moments packaging commodities as they can leave at any stage of the operation, to attend to customers.

Having thus described my invention so that any one skilled in the art pertaining thereto may make and use the same, I claim:—

1. In a scale, a frame, a scale beam, a delivery chute, a feed gate, a catch adapted to engage with said gate and hold it open, a shaft and co-acting means between the shaft and gate, whereby said catch may yield to engage with the gate without influencing said shaft and whereby downward movement of said beam under load will actuate the shaft to release the catch and permit the gate to close.

2. In a scale, a frame, a storage hopper, a feed gate, a scale beam, a catch adapted to engage with said feed gate, a pair of studs projecting from the side of said catch, a shaft on which said catch swings, a pin extended from said shaft and lying between said studs, and a projection on said scale beam adapted to engage and rock said shaft.

3. The combination with a weighing mechanism of a delivery chute, a gate controlling said chute, a catch adapted to engage with said gate and hold same open, a shaft on which said catch swings, co-acting means between the shaft and gate whereby the catch may yield to engage with the gate without influencing the shaft, but movement of the shaft will shift the catch to release the gate, and means whereby the weighing mechanism may actuate the shaft.

4. In a scale, a frame, a scale beam, a funnel carrier suspended from said scale beam, a funnel removably positioned in said carrier, a rod secured to and depending from the carrier, a distance rod pivotally connected respectively with said rod and the frame and a container support adjustably positioned on the depending rod.

5. In a scale, a frame, a scale beam, a ring pivotally suspended from said scale beam, a rod secured to and depending from said ring, a distance rod pivotally connected respectively with the lower end of said rod and the frame, and a bag support adjustably mounted on said rod.

RICHARD J. ZANONE.